(12) United States Patent
Bush

(10) Patent No.: US 6,769,443 B2
(45) Date of Patent: Aug. 3, 2004

(54) PLUMBING CONTROL SYSTEM WITH SIGNAL RECOGNITION

(75) Inventor: Shawn D. Bush, Seminole County, FL (US)

(73) Assignee: I-CON Systems, Inc., Oviedo, FL (US)

( * ) Notice: Subject to any disclaimer, the term of this patent is extended or adjusted under 35 U.S.C. 154(b) by 267 days.

(21) Appl. No.: 10/134,792

(22) Filed: Apr. 29, 2002

(65) Prior Publication Data

US 2003/0201018 A1 Oct. 30, 2003

(51) Int. Cl.$^7$ ................................. G05D 7/06
(52) U.S. Cl. ..................... 137/1; 137/624.11; 4/623
(58) Field of Search ............. 137/624.11, 624.12, 137/1; 251/129.04; 4/623, DIG. 3

(56) References Cited

U.S. PATENT DOCUMENTS

| | | | |
|---|---|---|---|
| 2,860,348 A | | 2/1958 | McClenahan |
| 3,987,502 A | | 10/1976 | Hartmann |
| 4,030,145 A | | 6/1977 | Rowan |
| 4,041,557 A | | 8/1977 | Ringler |
| 4,195,374 A | | 4/1980 | Morris et al. |
| 4,203,173 A | | 5/1980 | Morris et al. |
| 4,333,490 A | * | 6/1982 | Enter, Sr. ............... 137/624.11 |
| 4,471,498 A | | 9/1984 | Robertshaw |
| 4,538,307 A | | 9/1985 | Barnum et al. |
| 4,667,350 A | | 5/1987 | Ikenaga et al. |
| 4,716,605 A | | 1/1988 | Shepherd et al. |
| 4,802,246 A | | 2/1989 | Laverty, Jr. |
| 4,815,150 A | | 3/1989 | Uhlmann |
| 4,985,944 A | | 1/1991 | Shaw |
| 5,175,892 A | | 1/1993 | Shaw |
| 5,771,501 A | | 6/1998 | Shaw |
| 6,000,429 A | * | 12/1999 | Van Marcke .......... 251/129.04 |
| 6,125,870 A | * | 10/2000 | Furmanek ............... 137/624.11 |
| 6,209,576 B1 | * | 4/2001 | Davis ..................... 137/624.11 |

* cited by examiner

Primary Examiner—Kevin Lee
(74) Attorney, Agent, or Firm—Webb Ziesenheim Logsdon Orkin & Hanson, P.C.

(57) ABSTRACT

A control system is provided having a flow valve, a control valve for controlling flow through the flow valve, a logic circuit for receiving, processing, and transmitting data signals; a central control unit for receiving, processing, and transmitting data signals; and a flow valve actuator. When the flow valve actuator is actuated, the central control unit informs the logic circuit to permit the control valve to allow flow through the flow valve. However, if during a set time period, the flow valve actuator is actuated too often, subsequent actuation is disallowed for a second time period. Also, if during a shut down, subsequent actuation is disallowed. During the second time period or the shut down, any successive actuation is recorded by the central control unit.

27 Claims, 2 Drawing Sheets

PLUMBING CONTROL SYSTEM WITH SIGNAL RECOGNITION

BACKGROUND OF THE INVENTION

1. Field of the Invention

The present invention relates generally to fluid piping systems, and, in particular, to control systems for use in managing and controlling these fluid flow systems.

2. Brief Description of the Prior Art

Fluid control systems are used to manage and regulate the flow of fluid through plumbing systems, allowing and preventing fluid flow to and through various plumbing fixtures. For example, control systems are used to regulate flow through toilets and lavatories in a facility, such as a prison. A typical prior art plumbing control system includes a plurality of toilets and lavatories within a facility, each of which are integrated through an associated logic circuit, which, in turn, communicates with a central control unit. Also, each toilet and lavatory typically includes a push button sensor in a solenoid valve to operate the fixture. The control system uses the central control unit to receive requests from any individual fixture, process the request, and communicate an appropriate signal back to the logic circuit associated with each fixture, either allowing or disallowing fluid flow through a flow valve.

In certain facilities, such as a prison, these control systems can be used to delay operation of any single fixture, e.g., a toilet, within the facility, and/or to prevent such a fixture from being flushed more than a specified number of times within a predetermined time period, thereby preventing flooding of the toilet. Typically, these systems are classified as "delay" and/or "lockout" systems. For example, U.S. Pat. No. 4,985,944 is directed to a plumbing control system and method for prisons, which uses both a delay and a lockout feature. Specifically, the control mechanism of the '944 patent causes operation of the valve to be delayed for a selected period after the sensor has been operated (the "delay" feature) and limits the number of operations of the valve per unit time (the "lockout" feature). These features prevent a user from utilizing the fixture, e.g., a toilet, in a quick and successive manner, thereby overloading the fluid system. Further, these features block any attempt at operating the fixture too often within a set period of time. Another example of a plumbing control system which uses the delay feature is found in U.S. Pat. No. 5,771,501.

While the systems are effective in delaying or locking out fixtures and protecting excessive water use and system overload, there is a need for a system that also tracks such repeated requests for use. Further, there is a need for warning to the system controller, such that the controller can effectively be warned of requests for use and the offending user located. For example, in a prison situation, if an inmate is repeatedly attempting to flush a toilet, it is possible that the inmate is attempting to flush contraband down the toilet. While prior art systems can delay or slow the process down, or, alternatively, halt the ability to activate the fixture for a set period of time, heretofore they have not been effective in tracking and alarming the controller (guard) of such a situation. Therefore, there is a need for a control system that protects against repeated use of a fixture, overload of the fixture, overload of the system, and tracks and warns the controller of these repeated uses.

SUMMARY OF THE INVENTION

It is an object of the present invention to provide a control system for a fluid flow system which overcomes the deficiencies of the prior art. It is a further object of the present invention to provide a control system that can prevent excessive and repeated activation of a fixture, thereby preventing a system overload. It is a further object of the present invention to provide a control system that can manage and track the exact location of such repeated usage, such that the controller may immediately investigate the situation.

The present invention is directed to a control system for a fluid flow system that includes at least one flow valve with a flow valve fluid inlet and a flow valve fluid outlet. This system also includes a control valve in fluid communication with the flow valve for controlling the flow of fluid from a fluid piping system through the flow valve fluid inlet and out the flow valve fluid outlet. The system also includes a logic circuit in communication with the control valve for receiving, processing, and transmitting data signals through a communication line, and a central control unit for receiving, processing, and transmitting data signals through the communication line. In addition, a flow valve actuator is used to communicate activation to the flow valve via the logic circuit in the control valve.

In operation, when the flow valve actuator is actuated, an "activate" data signal is communicated to the central control unit, which communicates an "allow" data signal to the logic circuit. This permits the logic circuit to communicate an "allow to activate" data signal to the control valve, which, in turn, allows the control valve to permit fluid flow through the fluid piping system, through the flow valve fluid inlet, and out the flow valve fluid outlet. If, during a first predetermined time period, the flow valve actuator is actuated more than the predetermined allowable activation quantity, the "activate" data signal is communicated to the central control unit, however, the central control unit communicates a "disallow" data signal to the logic circuit. Next, since the logic circuit has received a "disallow" data signal, it does not permit a communication of the "allow to activate" data signal to the control valve. Since the control valve is not activated, fluid flow is not permitted through the flow valve and out of a fixture. This central control unit continues to communicate a "disallow" data signal to the logic circuit for any successive flow valve actuator actuations during a second predetermined time period, thereby locking out the system from activation for a set period of time. Any successive actuation of the flow valve actuator during the second predetermined time period is recorded by the central control unit. The central control unit may also be forced to communicate the "disallow" data signal at any time. During the forced "disallow", successive actuation of the flow valve actuator is recorded by the central control unit.

The present invention, both as to its construction and its method of operation, together with the additional objects and advantages thereof, would best be understood from the following description of specific embodiments when read in connection with the accompanying drawings.

DETAILED DESCRIPTION OF THE PREFERRED EMBODIMENTS

Figure 1:
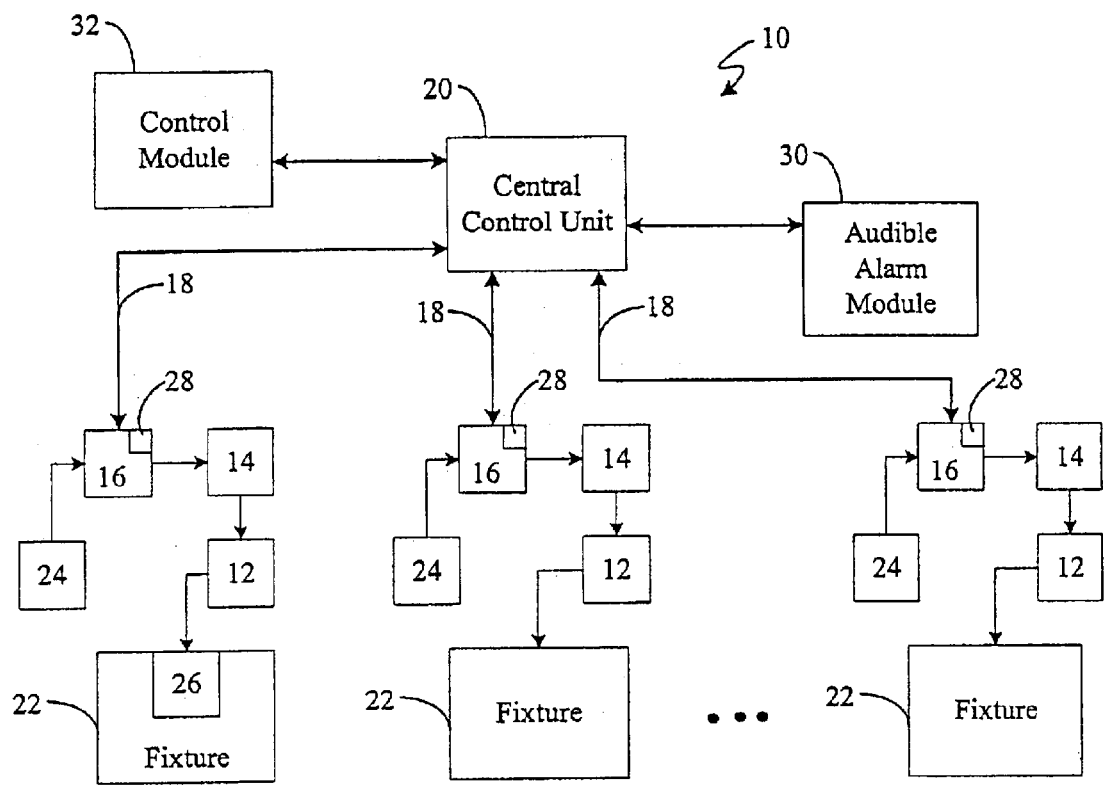
FIG. 1 is a block diagram of a control system for a fluid piping system according to the present invention.

The present invention is a control system 10 for use in connection with a fluid piping system. As seen in FIG. 1, control system 10 includes at least one flow valve 12, and typically a plurality of flow valves 12, with each flow valve 12 having a flow valve fluid inlet (not shown) and a flow valve fluid outlet (not shown). In order to control the flow of fluid, typically water, through the flow valve 12, each flow valve 12 has a control valve 14 associated with it. The control valve 14 is in fluid communication with the flow valve 12 and may be adjacent to or integrated with the flow valve 12. It is this control valve 14 that serves to either allow or disallow fluid flow through the flow valve 12, i.e., from the fluid piping system through the flow valve fluid inlet and out the flow valve fluid outlet.

Each control valve 14 is in communication with a logic circuit 16. The logic circuit 16 is used to receive, process, and transmit data signals through one or more communication lines 18. It is envisioned that the logic circuit 16 can be either associated with or integrated with the control valve 14. Each respective logic circuit 16 is in communication with a central control unit 20, which is configured to receive, process, and transmit data signals through the communication line 18. The central control unit 20 is adapted to control multiple and various types of fixtures 22 through their respective flow valves 12.

In order to activate the fixture 22, the control system 10 also includes a flow valve actuator 24, which is in communication with the flow valve 12 via the logic circuit 16 and the control valve 14. The flow valve actuator 24 may be any actuator capable of transmitting a request for operation of the fixture. For example, the flow valve actuator 24 may be a push button activator, an infrared sensor, or the like. It is also envisioned that the fixture 22 can be a toilet, a sink, a water fountain, a shower, etc. In the case of a sink, a water fountain, or a shower, the fixture 22 may also include a water outlet 26, e.g., a faucet.

The operation of one embodiment of the control system 10 according to the present invention begins when the flow valve actuator 24 is actuated. An "activate" data signal is communicated to the central control unit 20, typically via the associated logic circuit 16. A first predetermined time period is tracked by starting a first timer. The central control unit 20 communicates an "allow" data signal to the logic circuit 16, thereby allowing the logic circuit 16 to communicate an "allow to activate" data signal to the control valve 14. Next, the control valve 14 permits fluid to flow from the fluid piping system, through the flow valve 12 and into the fixture 22.

During the first predetermined time period, subsequent actuations of the flow valve actuator 24 result in the control valve 14 permitting fluid to flow from the fluid piping system, through the flow valve 12, and into the fixture 22, until a predetermined allowable activation quantity is reached.

During the first predetermined time period, when the flow valve actuator 24 is actuated for a number of times sufficient to reach the predetermined allowable activation quantity, the first timer is stopped and reset, and a second predetermined time period is tracked by starting a second timer. The "allow" data signal is sent to the logic circuit 16, thereby allowing the logic circuit 16 to communicate an "allow to activate" data signal to the control valve 14. The control valve 14 permits fluid to flow from the fluid piping system, through the flow valve 12, and into the fixture 22.

During the second predetermined time period, if the flow valve actuator 24 is actuated, the "activate" data signal is communicated to the central control unit 20, as discussed above. However, in this situation, the central control unit 20 will communicate a "disallow" data signal to the logic circuit 16. This "disallow" data signal halts the logic circuit 16 from, permitting communication of the "allow to activate" data signal to the control valve 14. This, in turn, prevents or disallows the control valve 14 to permit fluid to flow through the flow valve 12.

The central control unit 20 continues to communicate this "disallow" data signal to the logic circuit 16 for any successive flow valve actuator 24 actuations during the second predetermined time period. The central control unit 20 records any unsuccessful (or disallowed) actuations of the flow valve actuator 24 during this second predetermined time period.

Once the first predetermined time period has naturally expired, the control system 10 returns to its initial state, thereby allowing activation of the fixture 22 upon receipt of a further actuation request from the flow valve actuator 24 until the predetermined allowable activation quantity is reached again. Upon expiration of the second timer, the control system 10 waits for an actuation of the flow valve actuator 24. In other words, when the second timer expires, nothing happens with the control system 10. Alternatively, upon expiration of the second timer, the central control unit 20 sends the "allow to activate" data signal to the logic circuit 16, thereby allowing the control valve 14 to permit flow through the flow valve 12. The control system 10 then waits for an actuation of the flow valve actuator 24. In other words, when the second timer expires, fluid flow automatically occurs based upon a previous actuation of the flow valve actuator 24. Further alternatively, upon expiration of the second timer, the central control unit 20 sends the "allow to activate" data signal to the logic circuit 16, thereby allowing the control valve 14 to permit flow through the flow valve 12. The central control unit 20 records an actuation of the flow valve 12, and the first timer is started. In other words, when the second timer expires, fluid flow automatically occurs based upon a previous actuation of the flow valve actuator 24. This activation is again recorded, and the first timer is started.

Overall, the central control unit 20 allows a set number of activations of any one fixture 22 within a predetermined time period. However, once the predetermined allowable activation quantity is reached, the central control unit 20 disallows any further request for fluid flow through the remainder of the system for another predetermined time period. It is this operation that provides a "lockout" feature for preventing repeated activations of any one fixture 22, which would overload the fluid piping system.

Examples of typical ranges for the various time periods useful in the present invention include, for the first predetermined time period, from two minutes to ten minutes, for the second predetermined time period from 30 minutes to 90 minutes, and for the predetermined allowable activation quantity, from two to five activations. For example, the central control unit 20 is typically programmed to allow only two flushes of any toilet during any five-minute period. Submission of a single flush request by actuation of the flow valve actuator 24 will send the "activate" data signal to the central control unit 20, which will then send an "allow" data signal back to the logic circuit 16, causing the control valve 14 to open the flow valve 12 for a specified period, resulting in flushing of the toilet. Preferably, the "allow" data signal causes the control valve 14 to open the flow valve 12 and operate the fixture 22 without any delay in operation. Upon flushing of the toilet, the central control unit 20 automatically activates, via a first timer, a first predetermined time period, for example, five minutes, within which the central control unit 20 monitors the toilet. If a second flush request is submitted to the central control unit 20 by actuation of the flow valve actuator 24 at any time during that first predetermined time period, for example, within five minutes of the previous flush, the central control unit 20 will again communicate an "allow" data signal to the logic circuit 16, which, in turn, allows the control valve 14 to permit flow through the flow valve 12, flushing the toilet a second time, preferably without a delay.

At this point, the central control unit 20 will automatically activate, via a second timer, a second predetermined time period, for example, one hour, and prevent the toilet from any further flushing during this second predetermined time period. Thus, the toilet is effectively prevented or "locked out" from flushing until after expiration of the second predetermined time period. Submission of any flush requests by actuation of the flow valve actuator 24 during this lockout period will be tracked and recorded by the central control unit 20.

In another embodiment of the control system 10, the second time period is not "predetermined", but "dynamic" in that it is based on a remaining time of the first predetermined time period. Thus, only a certain number of activations are permitted during a specific time period. In operation, once the predetermined allowable activation quantity is reached, the central control unit 20 disallows any further request for fluid flow through the remainder of the system for the time remaining in the first dynamic time period, that is, the second time period is set to equal the remaining time in the first predetermined time period.

For example, if it is desired that only two flushes work in any one hour time period, the first flush would start the first predetermined time period running. Whenever the second flush is executed, for example, thirty-five minutes after the first flush, the second dynamic time period is set to be the remaining time of the first predetermined time period, in this situation, twenty-five minutes. For the next twenty-five minutes, no further flushes are permitted. Submission of any flush request by actuation of the flow valve actuator 24 during this second dynamic time period will be tracked and recorded by the central control unit 20.

After the second time period expires, whether the time period is a predetermined or a dynamic time period, the control system 10 is reset. Preferably, the toilet will not flush after expiration of the second time period until a subsequent flush request is submitted after expiration of the second time period, even if a flush request is submitted during the second time period. Submission of a flush request by actuation of the flow valve, actuator 24 after expiration of the second time period will send the "activate" data signal to the logic circuit 16, which will instruct the control valve 14 to permit the flow valve 12 to again operate, flushing the toilet. At this point, the central control unit 20 will again automatically activate the first predetermined time period within which the central control unit 20 monitors the toilet.

In another embodiment of the control system 10, it may be desirable to disallow any activation of the fixture 22 at any time, for example, during a search procedure of the prison. Whenever desired, a "shut down" is created by forcing the central control unit 20 to communicate the "disallow" data signal to the logic circuit 16. If the first predetermined time period or the second predetermined time period have previously been activated, that is, the first timer or the second timer are running, the predetermined time periods (and the timers) are reset. Alternatively, the predetermined time periods may be allowed to expire naturally. The "disallow" data signal is communicated to the logic circuit 16 until the central control unit 20 communicates the "allow" data signal, such as when an operator turns the system back on, or until a predetermined "shut down" time period expires. The central control unit 20 records any request for actuation of the flow valve actuator 24 during the "shut down". Thus, during the "shut down", a request for actuation of the flow valve actuator 24 at any time will not result in an activation of the control valve 14 under any circumstance, but will result in the request for actuation being transmitted to the central control unit and the disallowed request being recorded. In this manner, the central control unit 20 can track and record whether operation of a specific fixture is requested during the "shut down", which may indicate, for example, that an inmate is attempting to flush contraband down a toilet during a search being conducted during the "shut down".

Figure 2:
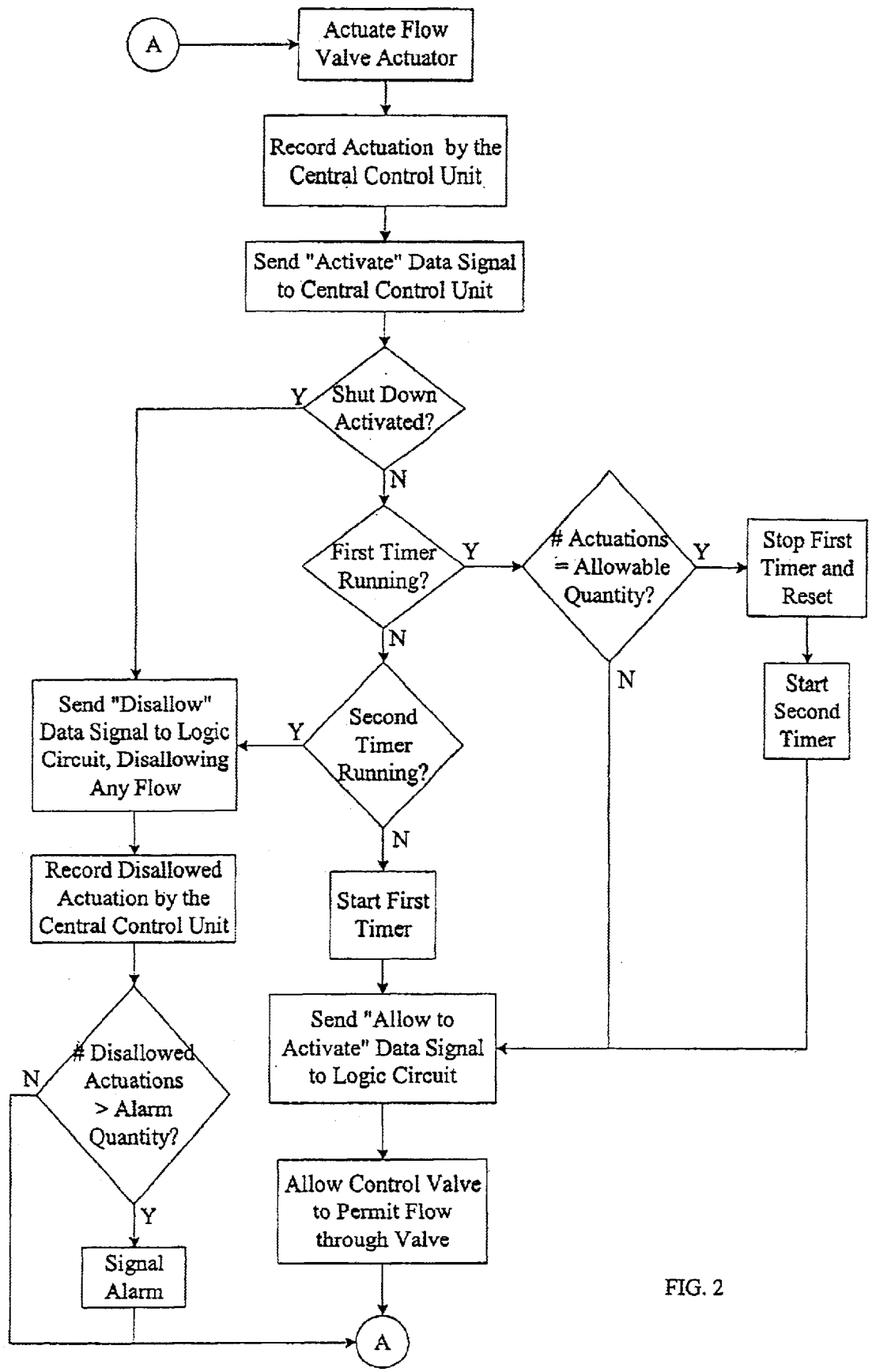
FIG. 2 is a flow diagram illustrating the operation of a control system according to the present invention.

Turning to FIG. 2, the preferred operation of the control system 10 begins with the flow valve actuator 24 being actuated. The actuation is recorded by the central control unit 20. Next, the "activate" data signal is sent to the central control unit 20, which checks whether the first timer, i.e., the timer associated with the first predetermined time period, is running. If the first timer is running, the actuation count is checked to see whether it is equal to the predetermined allowable activation quantity. If the actuation count is below the predetermined allowable activation quantity, the central control unit 20 sends the "allow to activate" data signal to the logic circuit 16, which allows the control valve 14 to permit flow through the flow valve 12. However, if the actuation count equals the predetermined allowable activation quantity, the first timer is stopped and reset, but not restarted, and the second timer, i.e., the timer tracking the second predetermined time period, is started. This means that further actuation will encounter a stopped first timer and a running second timer. At this point, since the second predetermined time period defines a lockout period, the "disallow" data signal is sent from the central control unit 20 to the logic circuit 16, and flow is halted or prevented through flow valve 12. Each disallowed actuation of the flow valve actuator 24 is recorded by the central control unit 20.

By recording each disallowed actuation of the flow valve actuator 24 during the "lockout" or "shut down" at the central control unit 20, a record can be maintained of any requests for actuation that are made for any particular unit. As such, a guard or other individual monitoring the central control unit 20 can observe the behavior during the "lockout" or "shut down" and will be alerted if a particular inmate is attempting to operate a fixture during such a "lockout" or "shut down", which may suggest, for example, that the inmate is attempting to flush contraband.

It is also envisioned that if the number of disallowed flow valve actuator 24 actuations during the second predetermined time period or during the "shut down" exceeds a predetermined alarm quantity, the central control unit 20 produces an "alarm" data signal. For example, the central control 20 unit may record each actuation during the second predetermined time period or during the "shut down", but may only signal an alarm after a predetermined number of actuations have been requested during the second predetermined time period (i.e., the "lockout") or the "shut down". Further, the control system 10 may include an audible alarm module 30, such that if the audible alarm module 30 receives the "alarm" data signal from the central control unit 20, the audible alarm module 30 produces an audible alarm. This would allow the controller, or in the case of a prison, the guard, to be notified of the possibility that a prisoner is attempting to flush contraband down a toilet.

The flow valve actuator 24 may require mechanical actuation, such as a knob or switch. When such mechanical actuation is required, the logic circuit 16 may also include an analog/digital signal converter 28. Since the flow valve actuator 24 requires mechanical actuation, the "activate" data signal is an analog signal. When this analog signal is transmitted to the logic circuit 16, the analog/digital signal converter 28 converts the analog "activate" data signal to a digital "activate" data signal, which is then transmitted to the central control unit 20 via the communication line 18.

While the flow valve actuator 24 may be mechanical, it may also be a sensor. In particular, the flow valve actuator 24 may be a touch sensor, such that, when contacted, the touch sensor communicates the "activate" signal to the central control unit 20, typically via the logic circuit 16. In addition, the flow valve actuator 24 may be adjacent the fixture 22, so long as the fixture 22 is in fluid communication with the flow valve 12. It is also envisioned that the flow valve actuator 24 is integrated with the fixture 22.

The control system 10 may also include a control module 32, which allows a user to set the first predetermined time period or the first timer, the second predetermined time period or the second timer, and the predetermined allowable activation quantity. Additionally, the control module 32 allows the user to force the "shut down" at the central control unit 20 or to set the predetermined "shut down" time period. Also, this control module 32 may be a separate unit or integrated with the central control unit 20.

The present invention provides a control system 10 that effectively monitors and locks out the fluid piping system and flow of fluid to a fixture 22 after repeated actuations of the flow valve actuator 24. This ensures that the fluid piping system will not be overloaded or misused. Further, the present invention provides a control system 10 that tracks and manages successive actuations of the flow valve actuator 24 during the "lockout" or "shut down". This is particularly useful in situations where the controller needs to monitor certain user behaviors in the overall quantity of actuations during any set period. In the area of prison plumbing systems, this recordation is particularly useful when used together with the alarm feature, thereby notifying a guard that an inmate may possibly be attempting to flush contraband down a toilet or other water drain.

This invention has been described with reference to the preferred embodiments. Other modifications and alterations will be apparent to others upon reading and understanding the preceding detailed description. It is intended that the invention be construed as including all such modifications and alterations.

The invention claimed is:

1. A control system for a fluid piping system, comprising:
at least one flow valve having a flow valve fluid inlet and a flow valve fluid outlet;
a control valve in fluid communication with the flow valve and configured to operate the flow valve by controlling the flow of fluid through the fluid piping system through the flow valve fluid inlet and out the flow valve fluid outlet;
a flow valve actuator for requesting activation of the control valve for operation of the flow valve; and
a central control unit adapted for receiving, processing, and transmitting data signals between the flow valve actuator and the control valve for operation of the flow valve such that the central control unit determines whether activation of the control valve based on an activation request from the flow valve actuator would exceed a predetermined allowable activation quantity within a first predetermined time period, prevents activation of the control valve for a second time period if activation of the control valve would exceed a predetermined allowable activation quantity within the first predetermined time period, and records any request for activation of the control valve received from the flow valve actuator during the second time period.

2. The control system of claim 1, wherein the second time period is predetermined.

3. The control system of claim 1, wherein the second time period is based on a remaining time of the first predetermined time period.

4. The control system of claim 1, further comprising a logic circuit in communication with the flow valve actuator, the control valve, and the central control unit and configured to receive, process, and transmit data signals between the flow valve actuator and the control valve through the central control unit.

5. The control system of claim 1, wherein the central control unit signals an alarm upon receipt of a request for activation of the control valve received from the flow valve actuator during the second time period.

6. The control system of claim 1, wherein the central control unit signals an alarm if the number of requests for activation of the control valve received from the flow valve actuator during the second time period exceeds a predetermined alarm quantity.

7. The control system of claim 1, wherein the flow valve is in fluid communication with a fixture.

8. The control system of claim 7, wherein the fixture is one of a toilet, a sink, a water fountain, or a shower.

9. The control system of claim 1, wherein the first predetermined time period is in the range of about two minutes to about ten minutes.

10. The control system of claim 1, wherein the second time period is in the range of about 30 minutes to about 90 minutes.

11. The control system of claim 1, wherein the predetermined allowable activation quantity is in the range of two to five.

12. The control system of claim 1, wherein the flow valve actuator is a sensor.

13. The control system of claim 12, wherein the sensor is an optical sensor.

14. The control system of claim 12, wherein the flow valve actuator is a touch sensor.

15. The control system of claim 1, wherein the central control unit further comprises a control module which allows a user to set the first predetermined time period, the second time period, and/or the predetermined allowable activation quantity.

16. The control system of claim 1, wherein the central control unit prevents activation of the control valve upon an input to start a shut down regardless of whether activation of the control valve would exceed the predetermined allowable activation quantity, continues to prevent activation of the control valve until a second input is received to end the shut down or a shut down time period expires, and records any request for activation of the control valve received from the flow valve actuator during the shut down.

17. The control system of claim 16, further comprising a control module which allows a user to send the input to start the shut down, to send the second input to end the shut down, or to set the shut down time period.

18. A control system for a fluid piping system, comprising:

at least one flow valve having a flow valve fluid inlet and a flow valve fluid outlet;

a control valve in fluid communication with the flow valve and configured to control the flow of fluid through the fluid piping system through the flow valve fluid inlet and out the flow valve fluid outlet;

a logic circuit in communication with the control valve and configured to receive, process, and transmit data signals through a communication line;

a central control unit configured to receive, process, and transmit data signals through the communication line; and a flow valve actuator in communication with the flow valve via the logic circuit and the control valve;

wherein, when the flow valve actuator is actuated, an activate data signal is communicated to the central control unit, which communicates an allow data signal to the logic circuit, thereby permitting the logic circuit to communicate an allow to activate data signal to the control valve, allowing the control valve to permit fluid flow from the fluid piping system, through the flow valve fluid inlet and out the flow valve fluid outlet;

wherein, if during a first predetermined time period, the flow valve actuator is actuated more than a predetermined allowable activation quantity, the activate data signal is communicated to the central control unit, which communicates a disallow data signal to the logic circuit, thereby not permitting the logic circuit to communicate the allow to activate data signal to the control valve, thereby preventing the control valve to permit fluid to flow through the flow valve, the central control unit continuing to communicate the disallow data signal to the logic circuit for any successive flow valve actuator actuations during a second time period; and wherein, any successive flow valve actuator actuation during the second time period is recorded by the central control unit.

19. A method for controlling fluid flow through a fluid piping system comprising the steps of:

signaling to a central control unit a request for activation of a control valve;

determining whether activation of the control valve would exceed a predetermined number of activations within a first predetermined time period;

preventing activation of the control valve for a second time period if activation of the control valve would exceed a predetermined number of activations within the first predetermined time period; and recording in the central control unit any request for activation of the control valve received during the second time period.

20. The method of claim 19, further comprising a step of signaling an alarm by the central control unit upon receipt of any request for activation of the control valve received during the second time period.

21. The method of claim 19, further comprising a step of signaling an alarm by the central control unit if the number of requests for activation of the control valve received during the second time period exceeds a predetermined alarm quantity.

22. The method of claim 19, wherein the first predetermined time period is in the range of about two minutes to about ten minutes.

23. The method of claim 19, wherein the second time period is in the range of about 30 minutes to about 90 minutes.

24. The method of claim 19, wherein the predetermined allowable activation quantity is in the range of two to five.

25. The control system of claim 19, wherein the second time period is predetermined.

26. The control system of claim 19, wherein the second time period is based on a remaining time of the first predetermined time period.

27. A method for controlling fluid flow through a fluid piping system, comprising the steps of:

signaling to a central control unit a request for activation of a control valve; and if an input to start a shut down has been received by the central control unit,
preventing activation of the control valve;
recording the prevention of the control valve; and
continuing to prevent activation of the control valve until a second input is received by the central control unit to end the shut down or a shut down time period expires.

* * * * *